Dec. 6, 1927. 1,651,797
J. ASTROM
FILTER
Filed Jan. 6, 1927
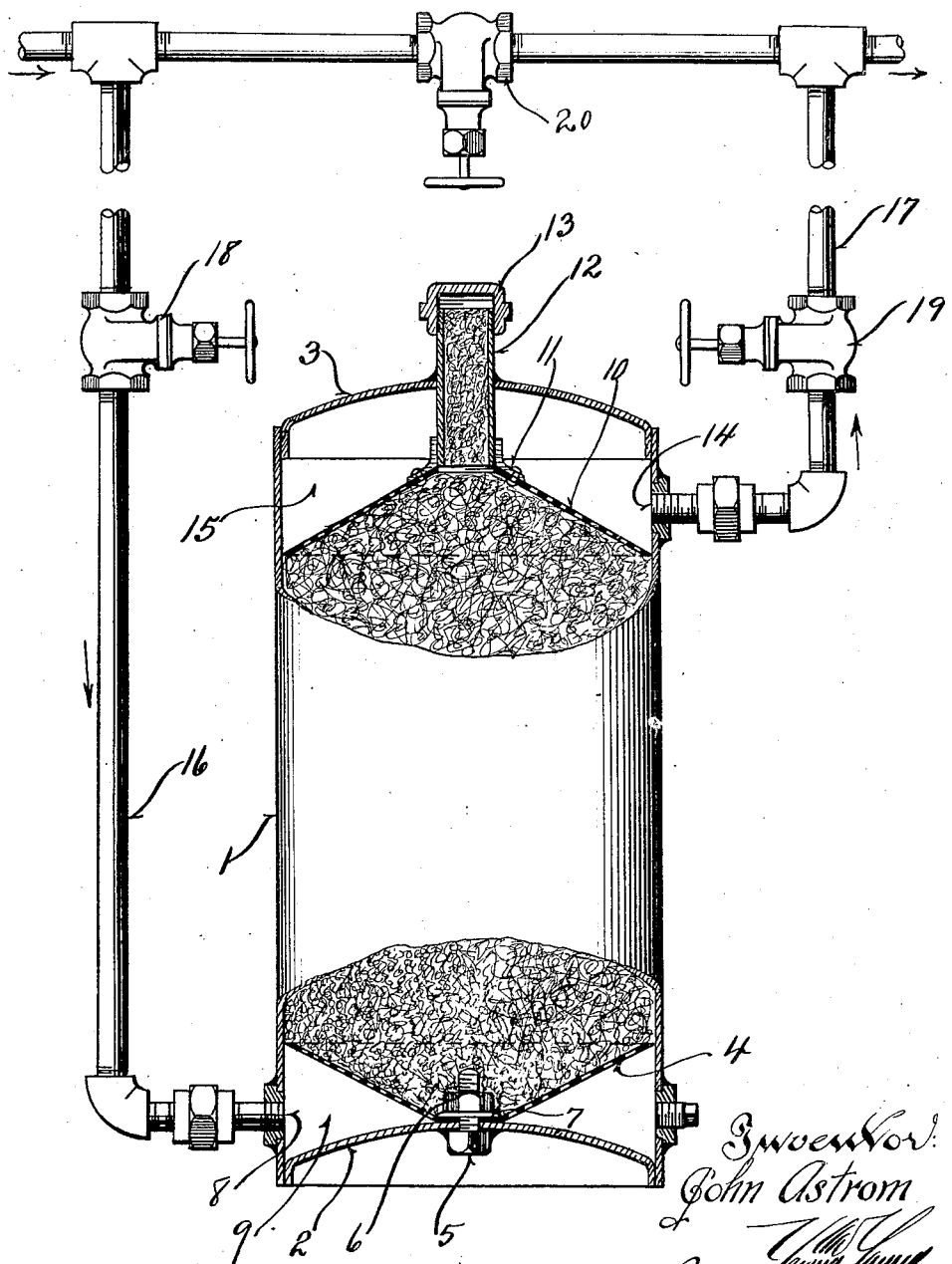
Inventor:
John Astrom Patented Dec. 6, 1927.

1,651,797

UNITED STATES PATENT OFFICE.

JOHN ASTROM, OF FORT WAYNE, INDIANA.

FILTER.

Application filed January 6, 1927. Serial No. 159,306.

This invention relates to filters.

Objects of this invention are to provide a novel form of filter in which compressed granulated cork is used, and in which a novel manner of charging and reconditioning the filter so as to apply pressure to the cork is secured.

Further objects are to provide a small or medium sized filter of light weight which is easy to install and is convenient to recondition when exhausted, and which has an especially large capacity and high efficiency.

Further objects are to provide a new type of filter which is particularly adapted for domestic and similar uses, and which as stated although made in small sizes has an exceptionally large capacity.

Further objects are to provide a novel form of filter which provides for the easy filling with cork and for the easy removal of the cork after the cork has been in use a great length of time.

A further object of this invention is to provide a novel method of compressing granulated cork in a filter so that no additional mechanism is required for securing this compression.

An embodiment of the invention is shown in the accompanying drawings in which:

The single view illustrates the filter partly in section and connected to the supply and discharge pipes.

Referring to the drawing, a cylindrical vessel or tank 1 is closed by a bottom 2 and a head 3. A conical screen 4 made of perforated metal is secured to the bottom 2 by means of a bolt 5 and nut 6 so that its central part is clamped between the bottom and a washer 7. The head of the bolt 5 is welded on the outside to the bottom 2 to form a tight joint. The base of the conical screen 4 fits the inside of the tank 1 closely and extends a sufficient distance above the bottom 2 to give room for the inlet opening 8 between said bottom and base. The conical shape of the screen 4 not only gives it strength for resisting pressure from the inside of the tank, but also forms a circular space 9 extending all around the tank, which gives any liquid entering the opening 8 free access to every part of the screen 4.

Another conical screen 10, cut out at its center, is riveted or otherwise fastened to the saddle flange 11 which is tapped to receive a nipple 12. This nipple 12 extends through the head 3, is welded thereto to make a tight joint, and is closed by a cap 13. The outer edge of the screen 10 has a close fit with the inside of tank 1 and extends far enough into the tank to make room for the outlet opening 14. The conical shape of screen 10 gives it strength to resist pressure from the inside of the tank 1, and at the same time, forms a circular space 15 extending all around the tank, which gives all the liquid coming through screen 10 free access to the outlet opening 14.

Although any filtering material in common use may be employed, this filter is particularly effective when filled with granulated cork in compression. The dry cork is first introduced through the nipple 12 after cap 13 has been removed. When the filter is full, a certain excess amount of cork is forced in, after which the cap 13 is replaced, thereby closing the filter entirely. The raw water to be filtered is now introduced through pipe 16 into the bottom space 9 from where it is forced upwards through the cork and finally through the perforations of the upper screen 10 into space 15 and out through opening 14 into the service pipe 17. As soon as the air has been displaced and the cork thoroughly soaked a desired pressure is created by expansion within the filter whereby the cork is compressed until the pores or small openings between the grains are closed to a point where the water in passing leaves behind every particle of dirt and other foreign matter previously held in suspension and emerges perfectly clear.

When the capacity of the cork to absorb the foreign particles ceases, the filter is exhausted and the cork is floated out through the nipple 12, without the necessity of disconnecting the filter. After draining the filter, new cork is inserted or the old cork may be used over again after having been efficiently cleaned. A valve 18 is placed in the pipe line 16 and a valve 19 is placed in the pipe line 17 for controlling the filter. If desired, a bypass pipe 21 and valve 20 may be provided for permitting a direct flow of water from the supply pipe to the service pipe during the renovation of the filter.

While the water has been assumed to flow upwards through the filter, a downward flow is equally efficient.

In actual tests conducted with filters designed as here disclosed, one having a diameter of only 12 inches and a height of 18 inches of cork showed an efficiency of nearly 100% by visibility test after having filtered 20,000 gallons of ordinary dirty cistern water.

It will be seen that novel type of filter has been provided by this invention which although applicable to a variety of uses is nevertheless particularly well adapted for domestic use, as it may be made relatively small and compact and as it is very easy to install.

Further, the filter is so made, as described in detail above, that the process of compressing the cork may be very readily followed, as all that is necessary is to press the final cork in place through the filling tube while the cork is in a dry condition. The subsequent absorption of moisture causes the cork to expand and to thus place the entire body of cork under considerable pressure.

Although the invention has been described in considerable detail, such description is intended as illustrative rather than limiting as the invention may be variously embodied and as the scope of such invention is to be determined as claimed.

I claim:

1. A filter comprising a closed body portion, a pair of screens carried within said body portion adjacent its ends, granulated cork carried within said body portion between said screens, means for conducting a liquid to and from said filter and opening on the outer side of said screens, a filling tube extending through the upper part of said body portion through which the granulated cork may be inserted or removed, said filling tube extending through the screen adjacent the upper part of the body portion, and means for closing said filling tube.

2. A filter comprising a closed body portion, a pair of screens carried within said body portion adjacent its ends, granulated cork carried within said body portion between said screens, means for conducting a liquid to and from said filter and opening on the outer side of said screens, a filling tube extending through the upper part of said body portion through which the granulated cork may be inserted or removed, and means for closing said filling tube, said filling tube having its inner end extending through one of said screens.

3. A device of the class described comprising a cylindrical body portion having a bottom and a top, an upwardly flaring conical screen secured to said bottom, a filling tube projecting through said top, a downwardly flaring conical screen carried by said filling tube, a cap for said filling tube, a pipe opening into the space between said first mentioned screen and the bottom, a pipe opening into the space between said second mentioned screen and the top, and liquid treating material carried within said body portion and between said screens.

4. A filter comprising an upright body portion having a bottom and a top, a screen carried by said bottom and spaced therefrom, an upper screen spaced from the top, a filling tube passing through said top and supporting said upper screen, said tube opening below said upper screen and said upper screen converging towards said tube, pipes opening into the space between the bottom and the top and the corresponding screens, granulated cork carried within said body portion and between said screens, and a removable closure for said tube, whereby said cork may be floated out of said filling tube and new cork inserted.

In testimony that I claim the foregoing I have hereunto set my hand at Fort Wayne, in the county of Allen and State of Indiana,

JOHN ASTROM.